US012794203B2

(12) United States Patent
Kiyota et al.

(10) Patent No.: US 12,794,203 B2
(45) Date of Patent: Nov. 10, 2026

(54) ELECTRICAL CONNECTION BOX

(71) Applicant: YAZAKI CORPORATION, Tokyo (JP)

(72) Inventors: Hirotaka Kiyota, Makinohara (JP); Takeshi Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 205 days.

(21) Appl. No.: 18/976,350

(22) Filed: Dec. 11, 2024

(65) Prior Publication Data

US 2025/0105608 A1 Mar. 27, 2025

Related U.S. Application Data

(63) Continuation of application No. PCT/JP2023/037618, filed on Oct. 18, 2023.

(30) Foreign Application Priority Data

Nov. 24, 2022 (JP) ................................ 2022-187141

(51) Int. Cl.
*H02G 3/16* (2006.01)
*H02G 3/14* (2006.01)

(52) U.S. Cl.
CPC ................ *H02G 3/16* (2013.01); *H02G 3/14* (2013.01)

(58) Field of Classification Search
None
See application file for complete search history.

(56) References Cited

U.S. PATENT DOCUMENTS 5,643,693 A * 7/1997 Hill ..................... H01M 50/296 429/123
5,748,068 A * 5/1998 Kiyota .................. H01R 9/223 337/186
2002/0170732 A1* 11/2002 Chiriku ................. H01H 50/12 174/59

(Continued)

FOREIGN PATENT DOCUMENTS

EP 1253613 A2 * 10/2002 .......... H01H 85/044
JP H0198458 U * 6/1989

(Continued)

OTHER PUBLICATIONS

Foreign Reference.*

*Primary Examiner* — Krystal Robinson
(74) *Attorney, Agent, or Firm* — KENEALY VAIDYA LLP

(57) ABSTRACT

An electrical connection box includes a circuit branching component that is disposed outside a frame and outside a tubular portion and includes a conductive circuit branching member embedded in a resin member, a tubular wall of the tubular portion includes a facing wall body that is disposed to face the circuit branching component outside the tubular portion, the resin member includes a holding portion that holds a load connection portion of the circuit branching member in a state where an exposed surface of the load connection portion is exposed, and the circuit branching component is disposed such that the exposed surface of the load connection portion faces the facing wall body, and the exposed surface is interposed between the holding portion and the facing wall body.

6 Claims, 13 Drawing Sheets

(56) References Cited

U.S. PATENT DOCUMENTS

| | | | | |
|---|---|---|---|---|
| 2004/0080923 | A1* | 4/2004 | Janisch | B60R 16/0239 361/826 |
| 2005/0218558 | A1* | 10/2005 | Asao | B29C 45/14065 425/577 |
| 2012/0024559 | A1* | 2/2012 | Sato | H05K 7/026 174/50 |
| 2012/0073852 | A1* | 3/2012 | Makino | H05K 5/0208 174/53 |
| 2016/0351368 | A1* | 12/2016 | Ikeda | H01H 85/20 |

FOREIGN PATENT DOCUMENTS

| | | | | | |
|---|---|---|---|---|---|
| JP | 2001256878 | A | * | 9/2001 | H01H 85/044 |
| JP | 3826657 | B2 | * | 9/2006 | H01H 85/044 |
| JP | 2014-93888 | A | | 5/2014 | |
| KR | 200438076 | Y1 | * | 1/2008 | B60R 16/0239 |

* cited by examiner

ELECTRICAL CONNECTION BOX

CROSS-REFERENCE TO RELATED APPLICATION(S)

This application is a continuation application of International Application No. PCT/JP2023/037618 filed on Oct. 18, 2023 which claims the benefit of priority from Japanese Patent Application No. 2022-187141 filed on Nov. 24, 2022 and designating the U.S., the entire contents of which are incorporated herein by reference.

BACKGROUND OF THE INVENTION

1. Field of the Invention

The present invention relates to an electrical connection box.

2. Description of the Related Art

In an electrical connection box, an electronic component such as a relay interposed between an external power supply and a load is housed in a housing. In the electrical connection box, an electric wire electrically connected to the electronic component is routed in the housing, and the electric wire is drawn out of the housing to be electrically connected to the power supply or the load. For example, the electrical connection box according to the related art is disclosed in Japanese Patent Application Laid-open No. 2014-93888.

Meanwhile, in recent vehicles, there is increasing adoption of electric wires that are difficult to bend, such as an electric wire that has a larger diameter to change a material of a core wire of the electric wire for weight reduction, or an electric wire that has a larger diameter for a large current. For this reason, in the electrical connection box, it is difficult to route the electric wire in a narrow space in the housing, and there is a possibility that an overload is applied to the periphery from the electric wire in the housing. In the electrical connection box, for example, it is possible to suppress an overload in the housing due to the electric wire by disposing such an electric wire and a component connected to the electric wire outside the housing. However, in the electrical connection box, in a case where the component is disposed outside the housing and an electrical connection point physically connected between the component and the electric wire connected to the component is disposed outside the housing, there is a possibility that another component such as a metal component or a tool touches the electrical connection point when assembling work or maintenance work for the peripheral component is performed outside the housing.

SUMMARY OF THE INVENTION

Therefore, an object of the present invention is to provide an electrical connection box capable of suppressing contact of other components with an electrical connection point outside a housing.

In order to achieve the above mentioned object, an electrical connection box according to one aspect of the present invention includes an electronic component; an internal conductive member that electrically connects the electronic component to an external power supply; a frame that includes a tubular portion that includes a tubular wall having an opening at least at one end and houses and holds the electronic component and the internal conductive member in the tubular portion; a cover member that closes the opening of the tubular portion; and a circuit branching component that is disposed outside the frame and outside the tubular portion and includes a conductive circuit branching member embedded in a resin member and interposed between the external power supply and an external load, wherein the internal conductive member includes a first electrical connection portion and a second electrical connection portion that are physically and electrically connected to the electronic component in the tubular portion, the circuit branching member includes a power supply connection portion that is exposed to an outside of the resin member, is disposed outside the frame and outside the tubular portion, and is physically and electrically connected to a power-supply-side terminal fitting of a terminal of a power-supply-side electric wire electrically connected to the external power supply and the second electrical connection portion of the internal conductive member, and a load connection portion that is exposed to the outside of the resin member, is disposed outside the frame and outside the tubular portion, and is physically and electrically connected to a load-side terminal fitting of a terminal of a load-side electric wire electrically connected to the external load, the tubular wall of the tubular portion includes a facing wall body disposed to face the circuit branching component outside the tubular portion, the resin member includes a holding portion that holds the load connection portion in a state where an exposed surface of the load connection portion is exposed, and the circuit branching component is disposed such that the exposed surface of the load connection portion faces the facing wall body, and the exposed surface is interposed between the holding portion and the facing wall body. The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an electrical connection box according to the present invention will be described in detail with reference to the drawings. Note that the present invention is not limited by the embodiment.

Embodiment

One embodiment of an electrical connection box according to the present invention will be described with reference to FIGS. 1 to 13.

Figure 1:
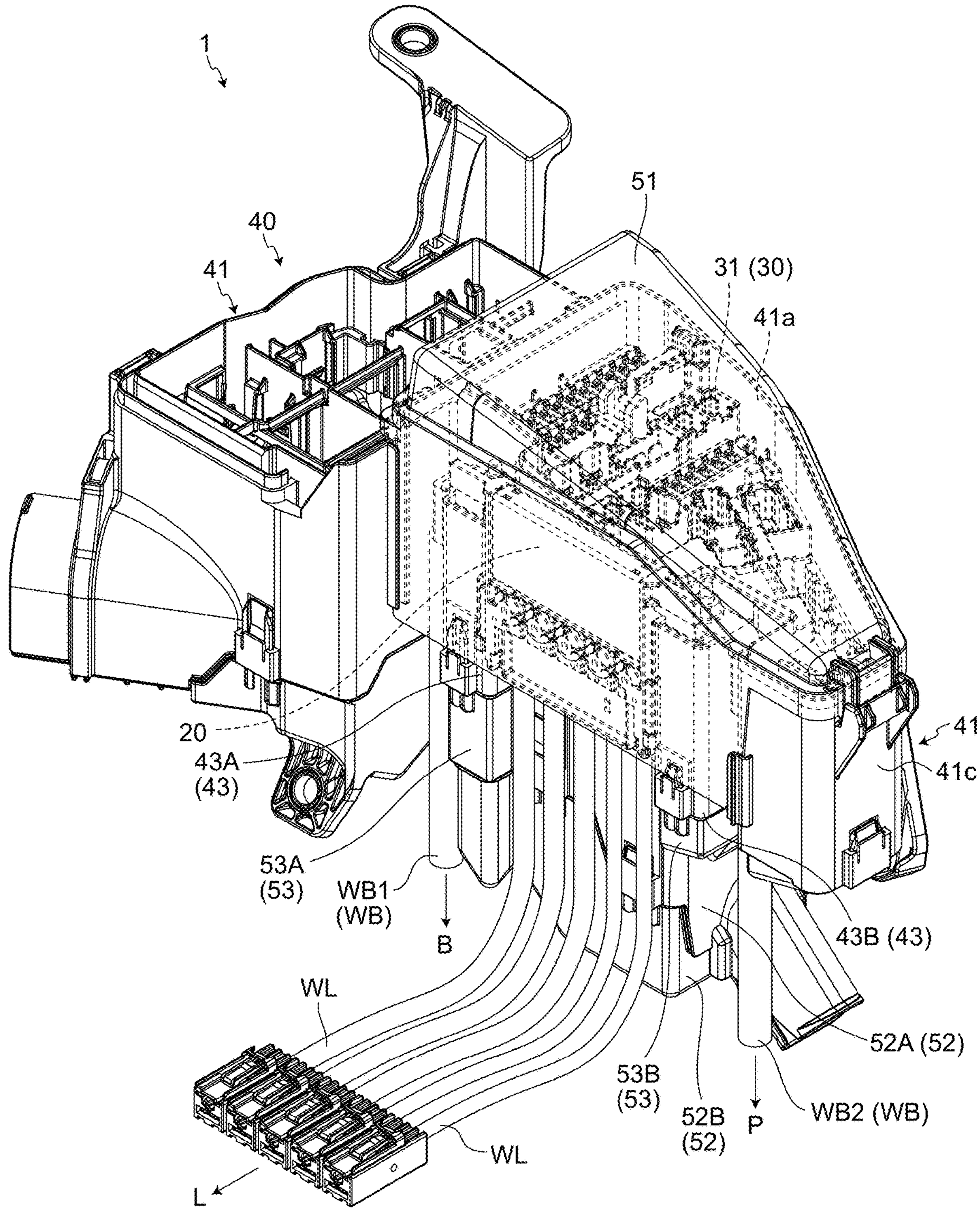
FIG. 1 is a perspective view illustrating an electrical connection box according to an embodiment.

Reference Numeral 1 illustrated in FIGS. 1 to 7 indicates the electrical connection box according to the present embodiment. An electrical connection box 1 is mounted on a vehicle such as an automobile, and is interposed between an external power supply B such as a secondary battery in the vehicle and an external load L such as a power distribution target (for example, auxiliary devices to be subjected to power supply) to supply power of the external power supply B to the external load L (FIG. 1).

The electrical connection box 1 includes an electronic component 10 such as a relay or a fuse (FIG. 2), and the electronic component 10 is interposed between the external power supply B and the external load L. Further, the electrical connection box 1 includes a circuit branching component 20 interposed between the external power supply B and the external load L (FIGS. 1 to 5). The circuit branching component 20 is a component for distributing power from the external power supply B to a plurality of external loads L. The electrical connection box 1 includes a plurality of electronic components 10 and at least one circuit branching component 20.

Figure 2:
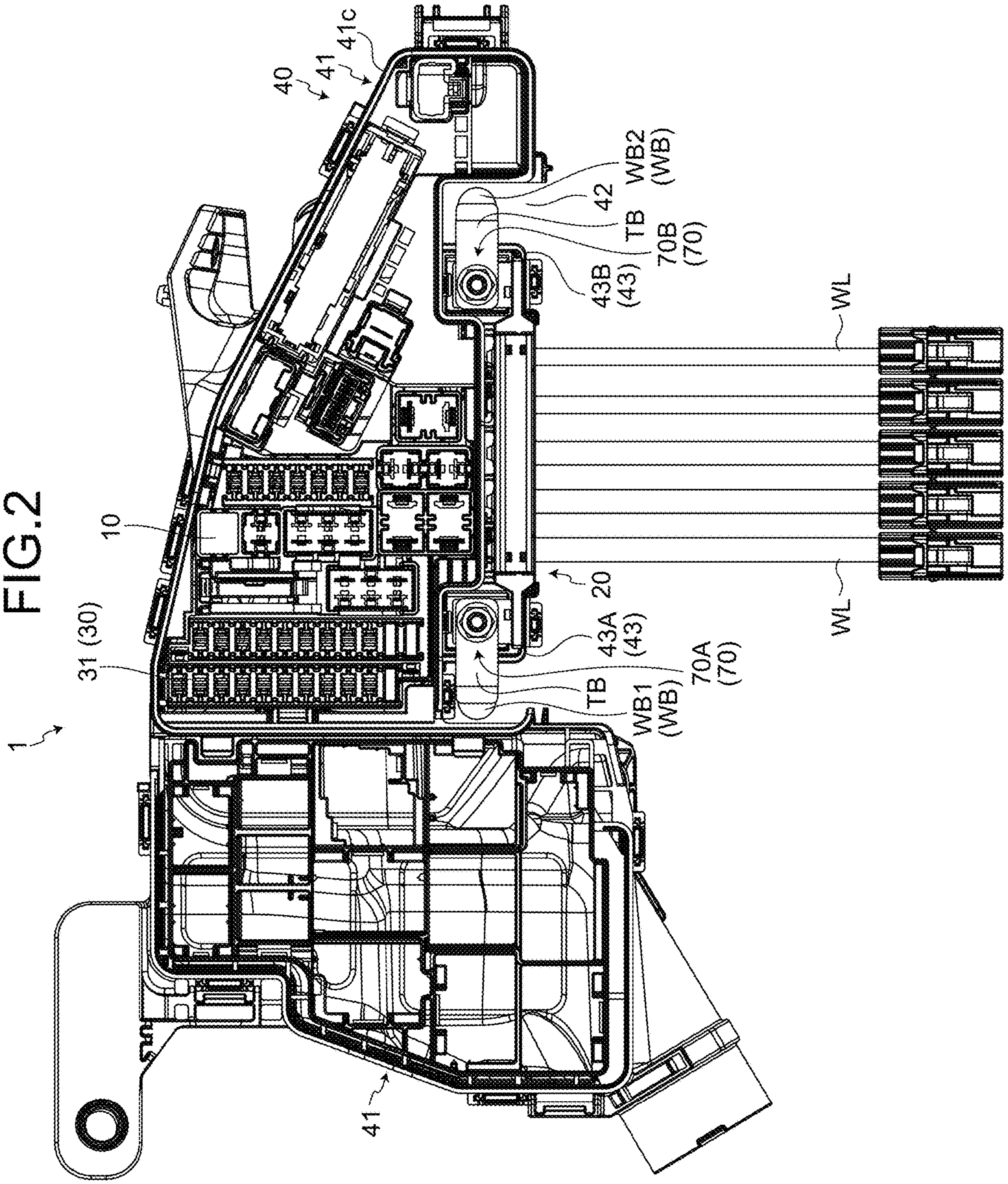
FIG. 2 is a plan view of the electrical connection box (without a first cover member) according to the embodiment when viewed from one opening side of a frame.
Figure 3:
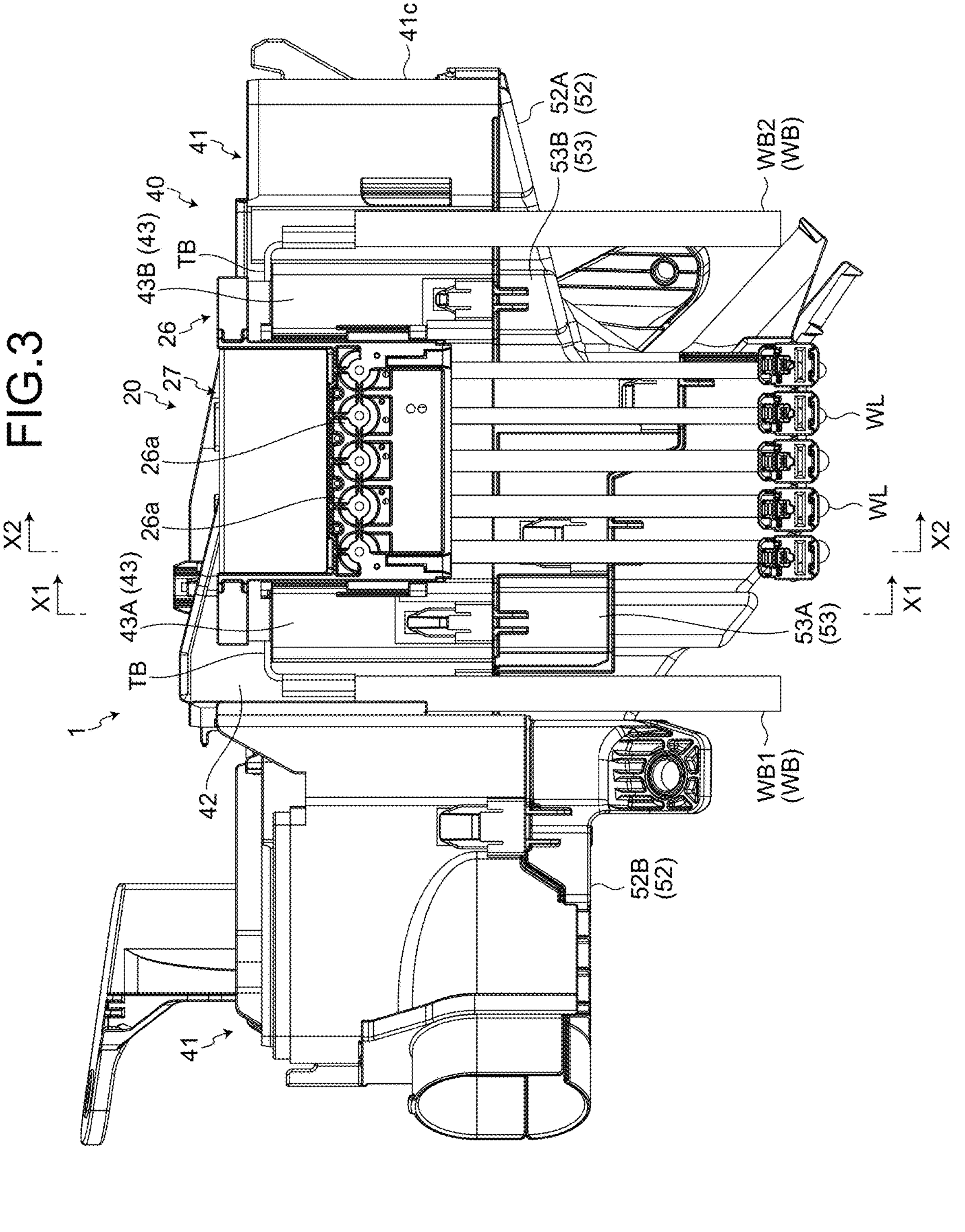
FIG. 3 is a plan view of the electrical connection box (without the first cover member) according to the embodiment when viewed from a lateral side of the frame.

The electrical connection box 1 includes a block 30 that holds the electronic component 10 and a frame 40 including a tubular portion 41 that houses and holds the block 30 therein and includes a tubular wall 41*c* having openings (openings 41*a* and 41*b*) at both ends (FIGS. 1 to 8). The electrical connection box 1 includes a cover member (hereinafter, referred to as a "first cover member") 51 that closes one opening 41*a* of the tubular portion 41 and a cover member (hereinafter, referred to as a "second cover member") 52 that closes the other opening 41*b* of the tubular portion 41 (FIGS. 1, 3, and 9). The block 30, the frame 40, the first cover member 51, and the second cover member 52 are formed of an insulating material such as a synthetic resin.

In the electrical connection box 1, a housing is formed by the frame 40, the first cover member 51, and the second cover member 52, and an electric wire (not illustrated) electrically connected to the electronic component 10 is routed in the housing and drawn out from an opening to the outside of the housing.

In the frame 40, the block 30 is inserted into the tubular portion 41 through the other opening 41*b*. In a case where the frame 40 is implemented by one tubular portion 41, the entire outer wall forming an outer frame is formed by the tubular wall 41*c* of the tubular portion 41. In addition, in a case where the frame 40 is implemented by a combination of a plurality of tubular portions 41 with the one openings 41*a* having the same opening direction and the other openings 41*b* having the same opening direction, the outer wall forming the outer frame is formed by a combination of parts of the tubular walls 41*c* of the plurality of tubular portions 41. That is, the outer wall forming the outer frame of the frame 40 is entirely or partially formed by the tubular wall 41*c* of the tubular portion 41.

The frame 40 illustrated here is a combination of two tubular portions 41, and is mounted on the vehicle with the one opening 41*a* facing an upper side of the vehicle. The first cover member 51 illustrated here is provided for each of the tubular portions 41. In addition, the second cover member 52 illustrated here is divided into a first divided cover 52A and a second divided cover 52B assembled with each other, and closes the other opening 41*b* of each of the two tubular portions 41 in a form in which the first divided cover 52A and the second divided cover 52B are assembled (FIGS. 1, 3, and 9).

Figure 5:
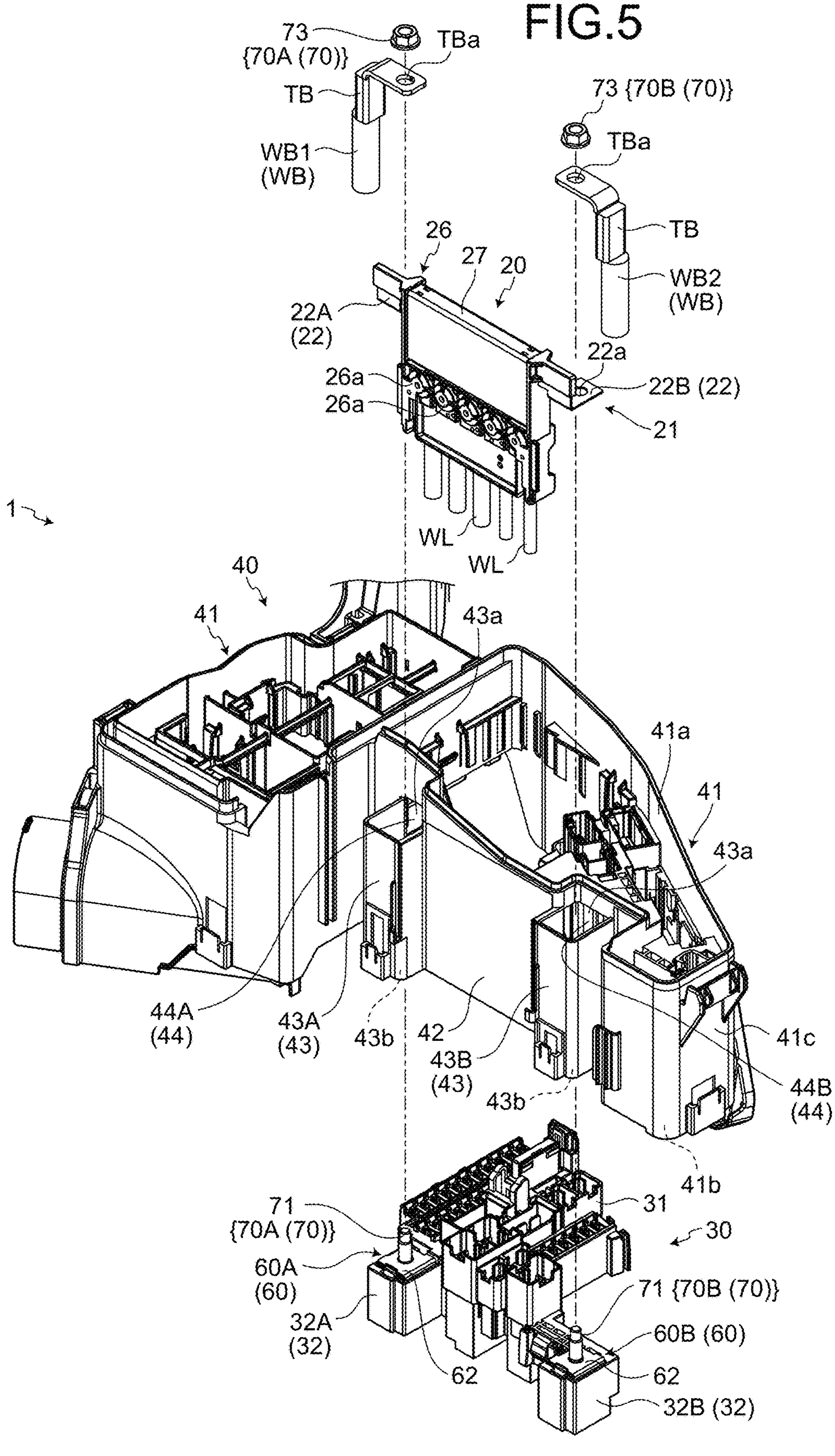
FIG. 5 is an exploded perspective view of the electrical connection box (without the first cover member and the second cover member) according to the embodiment when viewed from another angle.
Figure 6:
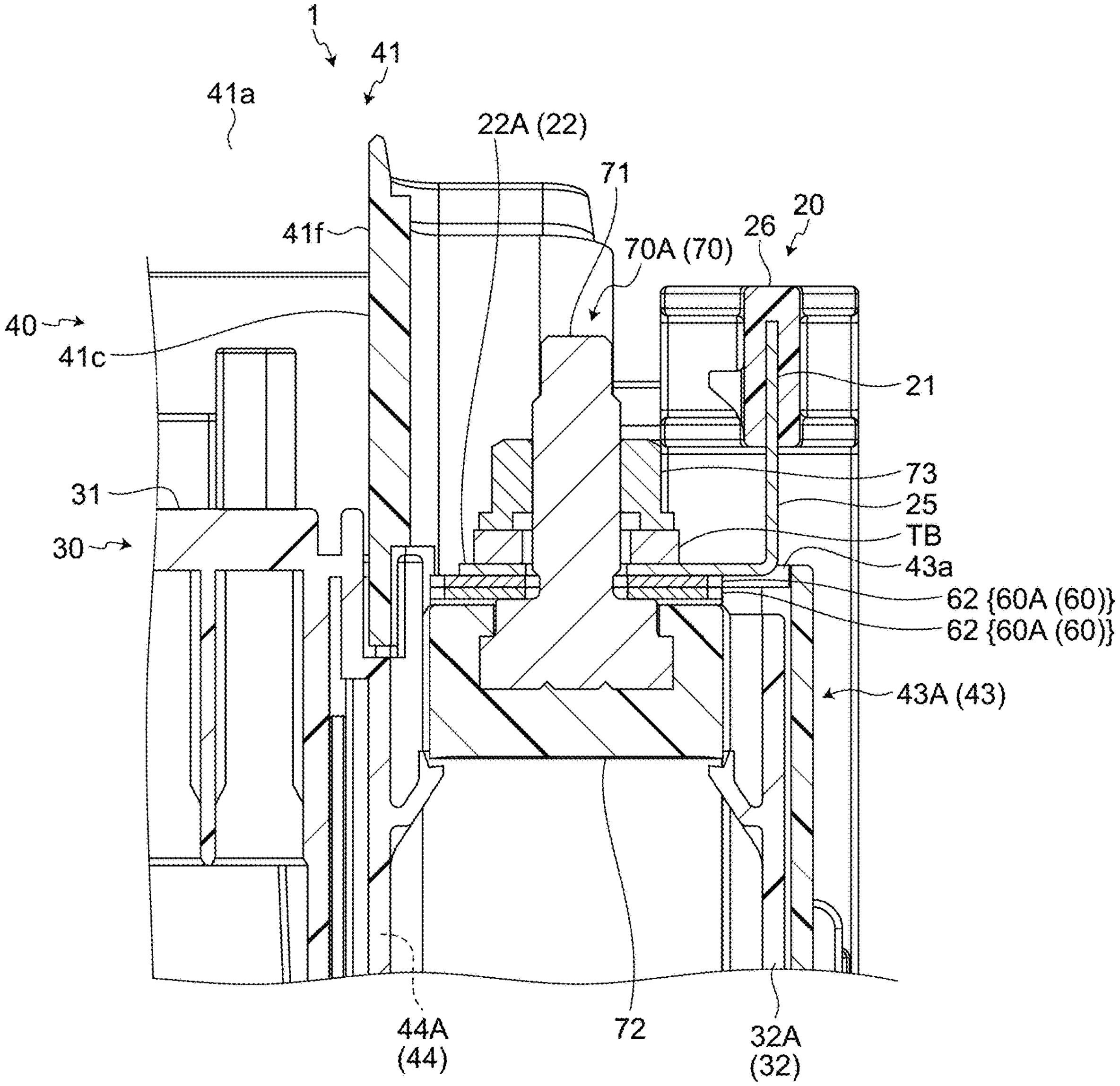
FIG. 6 is a cross-sectional view taken along line X1-X1 of FIG. 3.
Figure 8:
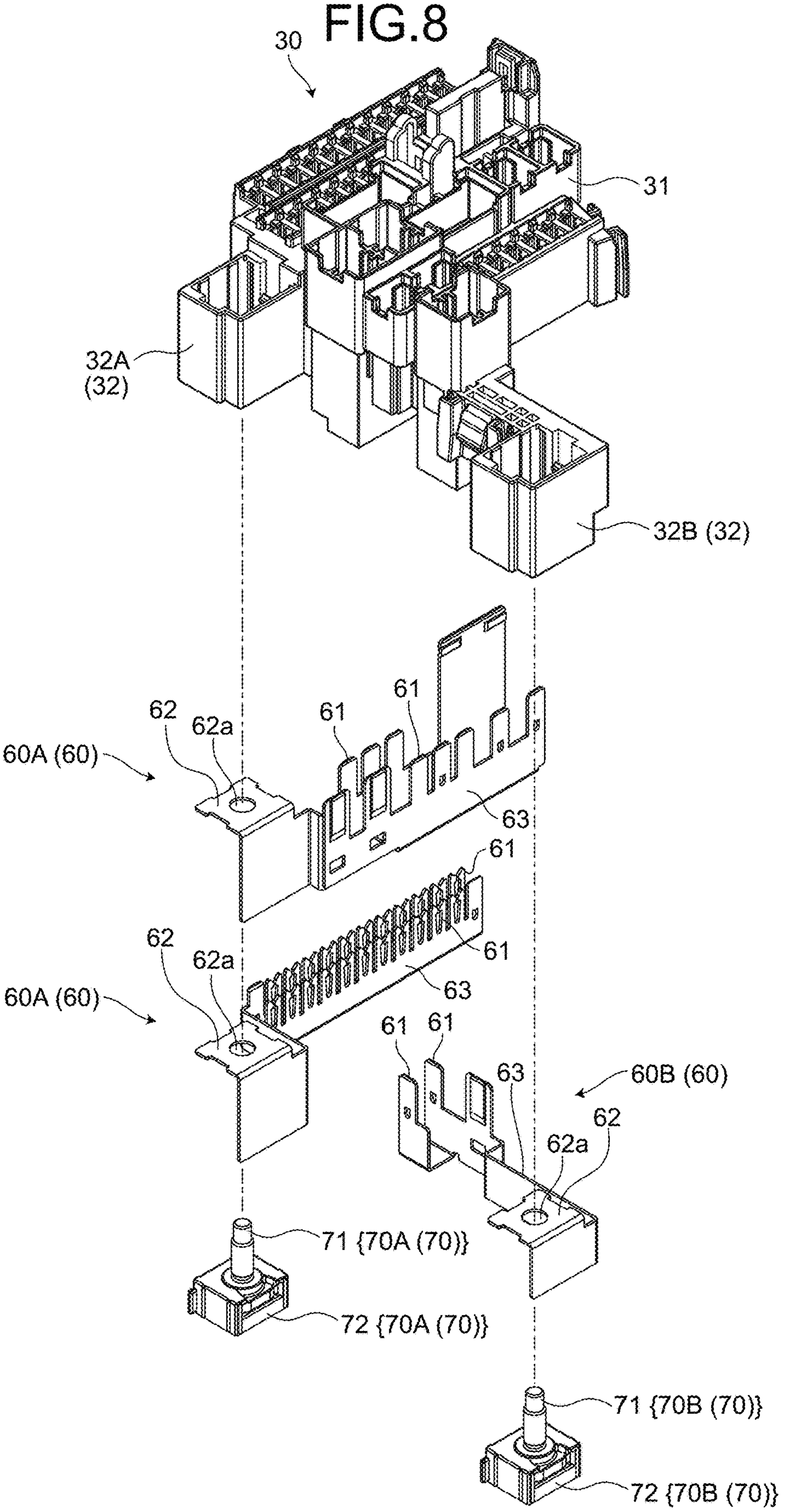
FIG. 8 is an exploded perspective view illustrating a block, and an internal conductive member and a male screw member housed in the block.
Figure 9:
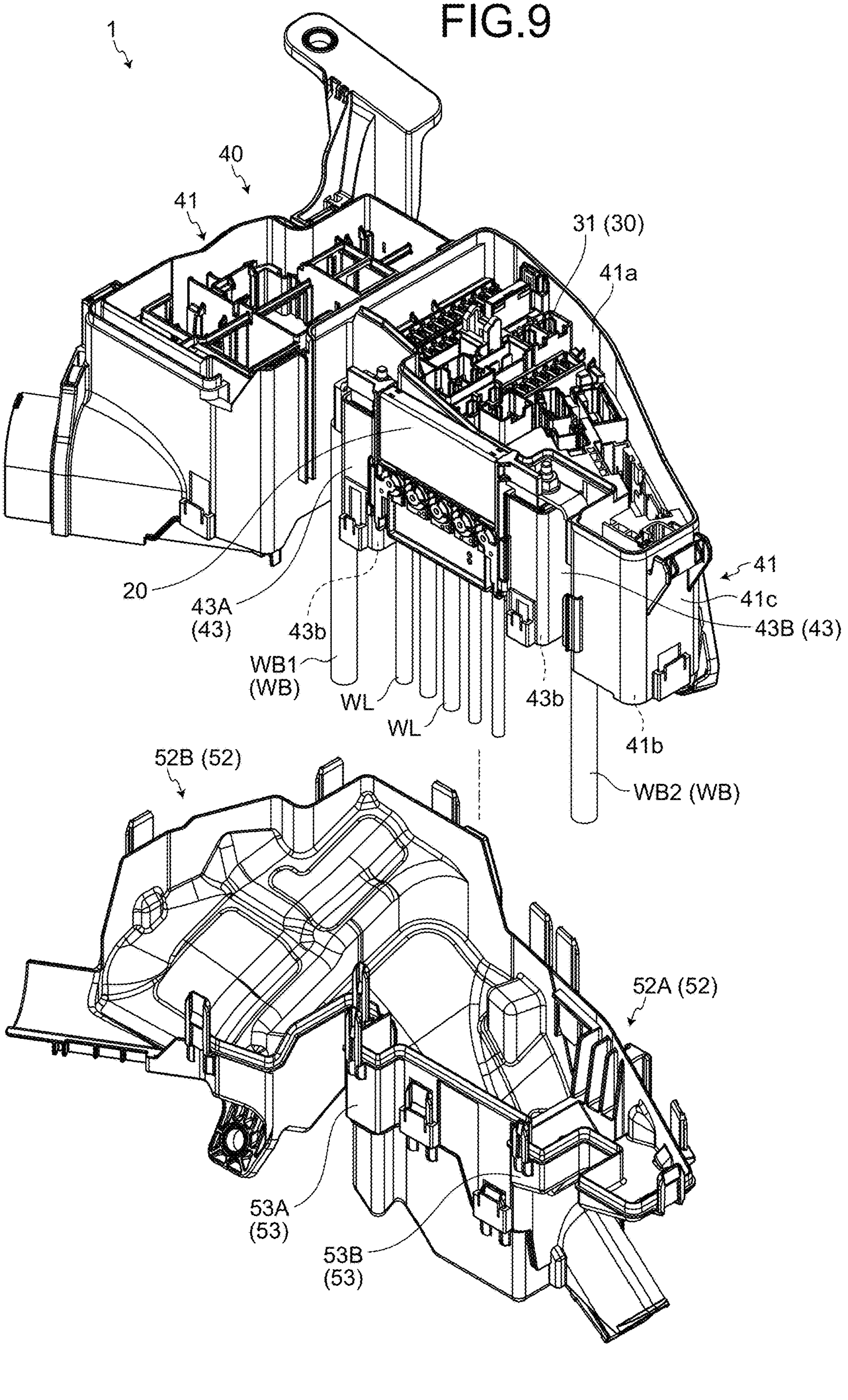
FIG. 9 is an exploded perspective view of the frame and the second cover member in the electrical connection box (without the first cover member) according to the embodiment.

The electrical connection box 1 includes an internal conductive member 60 that electrically connects the electronic component 10 to the external power supply B and is held by the block 30 together with the electronic component 10 (FIGS. 5, 6, and 8). The internal conductive member 60 includes a first electrical connection portion 61 that is physically and electrically connected to the electronic component 10 in the tubular portion 41 (FIG. 8). The first electrical connection portion 61 is provided for each electronic component 10. In addition, the internal conductive member 60 includes a second electrical connection portion 62 electrically connected to the external power supply B (FIGS. 5, 6, and 8). In the internal conductive member 60, the plurality of first electrical connection portions 61 and the second electrical connection portion 62 are connected by a coupling portion 63 (FIG. 8). The internal conductive member 60 has a shape in which the coupling portion 63 extends to the outside of the tubular portion 41, and the second electrical connection portion 62 is coupled to an end of the coupling portion 63 that extends outside the frame 40. That is, the second electrical connection portion 62 is disposed outside the frame 40 and outside the tubular portion 41.

The internal conductive member 60 is a so-called bus bar, and is formed in a plate shape using a metal plate as a base material, for example. The block 30 includes a block body 31 that holds the electronic component 10 and the internal conductive member 60 in the tubular portion 41 (FIGS. 1, 2, 4, 5, 8, and 9).

The electrical connection box 1 may include the frame 40 integrated with the block 30. The frame 40 includes the tubular wall 41*c* having an opening 41*a* at least at one end, and includes a tubular portion 41 that houses and holds the electronic component 10 and the internal conductive member 60 therein. For example, the electrical connection box 1 includes the first cover member 51 and the second cover member 52 as in the above example as long as the frame 40 includes the tubular portion 41 including the tubular wall 41*c* having openings (openings 41*a* and 41*b*) at both ends. On the other hand, the electrical connection box 1 includes only the first cover member 51 in a case where the frame 40 includes the tubular portion 41 (that is, the tubular portion 41 of which the opening 41*b* is closed) including the tubular wall 41*c* having only the opening 41*a*.

The circuit branching component 20 is disposed outside the frame 40 and outside the tubular portion 41. The circuit branching component 20 includes a conductive circuit branching member 21 interposed between the external power supply B and the external load L (FIGS. 4, 5, 10, and 11).

Here, the circuit branching component 20 includes at least a power supply connection portion 22 and a load connection portion 23 described below. The circuit branching component 20 includes a coupling portion 25 described below that electrically connects the power supply connection portion 22 and a plurality of load connection portions 23. However, the circuit branching component 20 illustrated here includes, in addition to the power supply connection portion 22 and the load connection portion 23, a fusible portion 24 described below for cutting off an overcurrent between the external power supply B and the external load L, and accordingly, includes the coupling portion 25 described below. That is, here, as an example of the circuit branching component 20, a circuit protection component for cutting off an overcurrent between the external power supply B and the external load L is exemplified. Therefore, the circuit branching component (circuit protection component) 20 illustrated here includes a conductive circuit protection member interposed between the external power supply B and the external load L as the circuit branching member 21.

The circuit branching member (circuit protection member) 21 is disposed outside the frame 40 and outside the tubular portion 41, and includes the power supply connection portion 22 that is physically and electrically connected to a power-supply-side terminal fitting TB of a terminal of a power-supply-side electric wire WB electrically connected to the external power supply B and the second electrical connection portion 62 of the internal conductive member 60 (FIGS. 4 to 6, 10, and 11).

Figure 10:
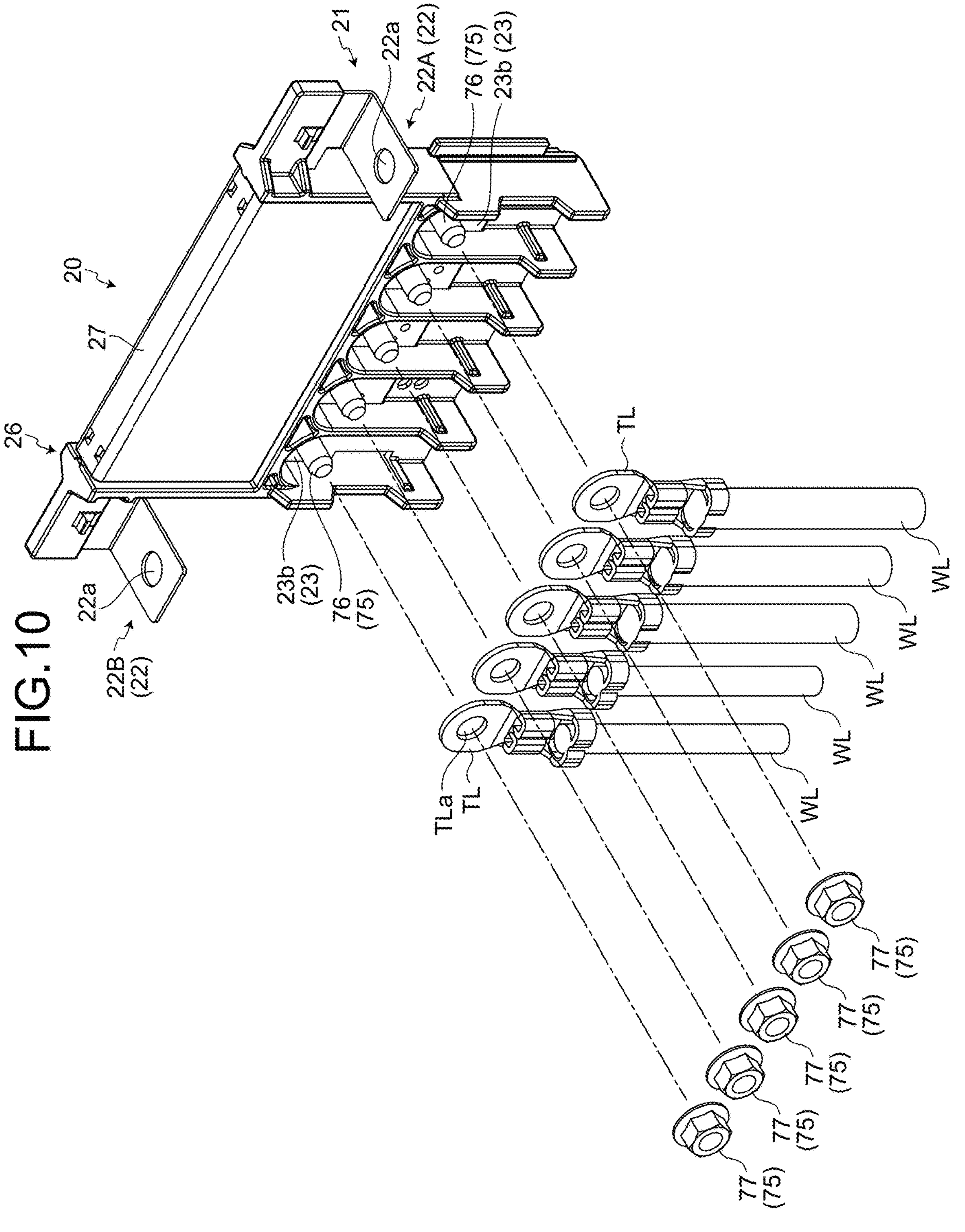
FIG. 10 is an exploded perspective view for describing a load-side electrical connection structure.
Figure 11:
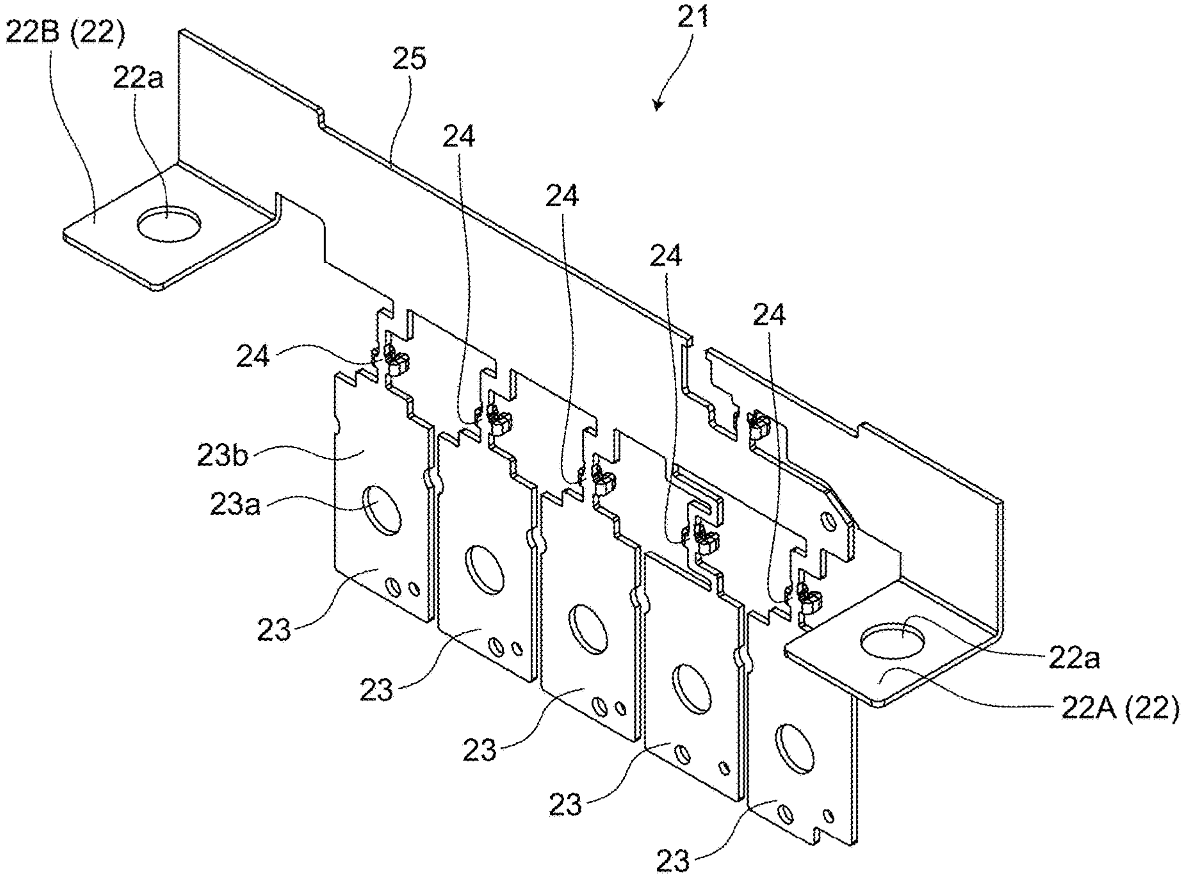
FIG. 11 is a perspective view illustrating a circuit protection member.
Figure 12:
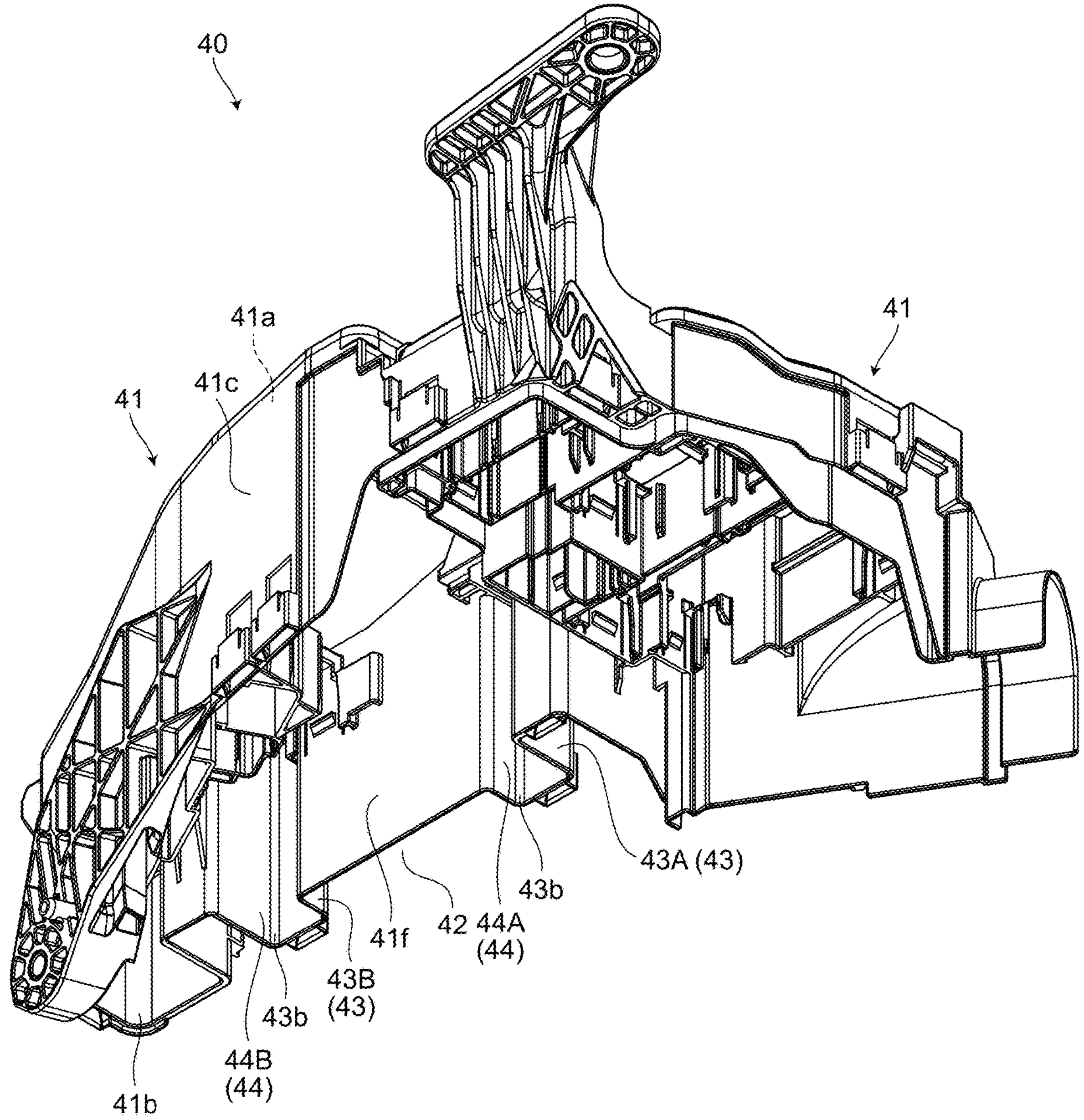
FIG. 12 is a perspective view illustrating the frame.
Figure 13:
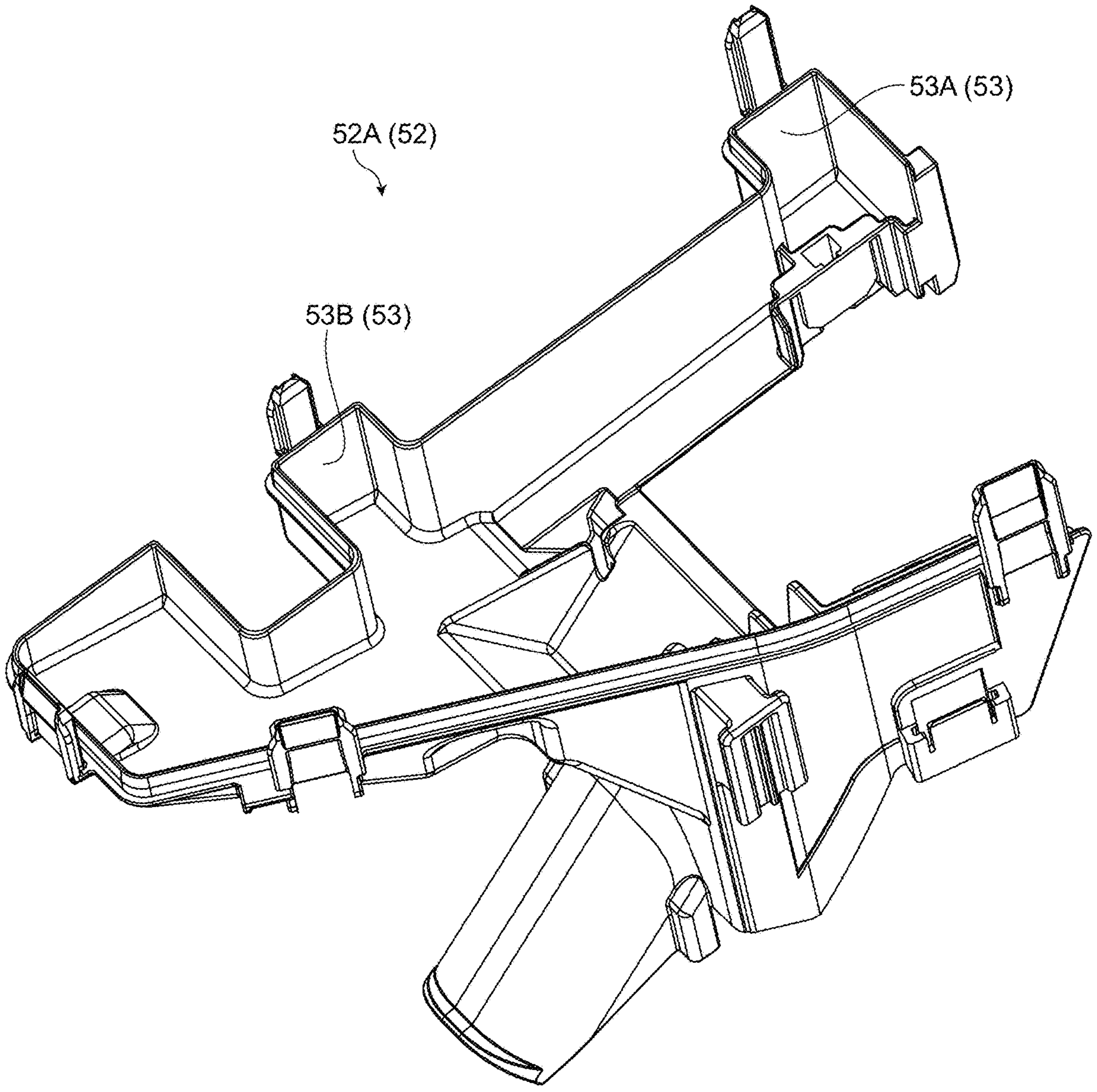
FIG. 13 is a perspective view illustrating a first divided cover.

In addition, the circuit branching member (circuit protection member) 21 includes the load connection portion 23 that is disposed outside the frame 40 and outside the tubular portion 41 and is physically and electrically connected to a load-side terminal fitting TL of a terminal of a load-side electric wire WL electrically connected to the external load L, and the fusible portion 24 that is interposed between the power supply connection portion 22 and the load connection portion 23 and is fused when an overcurrent flows (FIGS. 10 and 11). In the circuit branching member (circuit protection member) 21, the load connection portion 23 and the fusible portion 24 are provided for each external load L. The circuit branching member (circuit protection member) 21 includes the coupling portion 25 that couples the power supply connection portion 22 and the fusible portion 24 (FIG. 11). The power supply connection portion 22 and the fusible portion 24 for each external load L are connected to the coupling portion 25.

Figure 7:
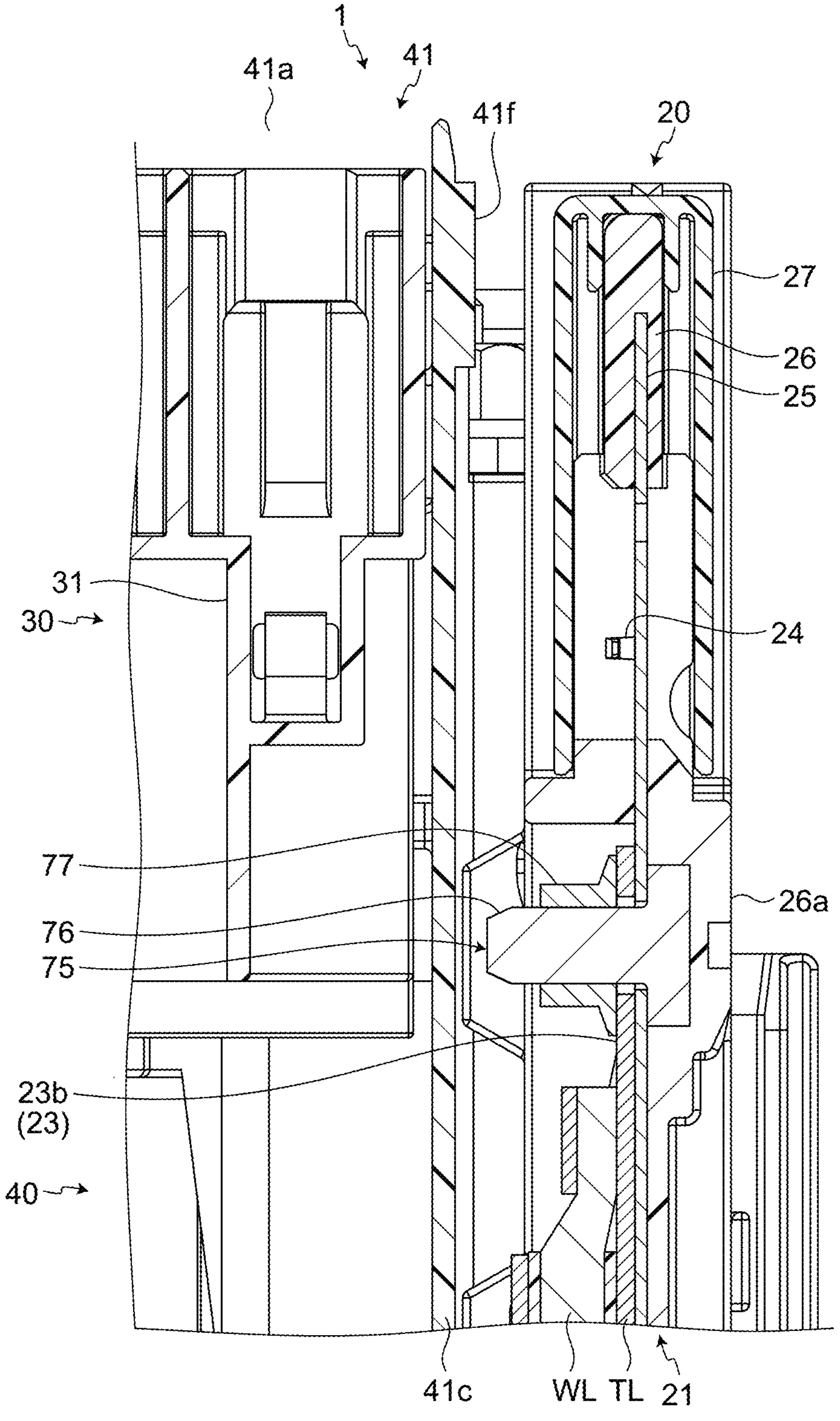
FIG. 7 is a cross-sectional view taken along line X2-X2 of FIG. 3.

The circuit branching member (circuit protection member) 21 is a so-called bus bar, and is formed in a plate shape using a metal plate as a base material, for example. In the circuit branching component (circuit protection component) 20, the circuit branching member (circuit protection member) 21 embedded in a resin member 26 is interposed between the external power supply B and the external load L. Therefore, in the circuit branching component (circuit protection component) 20, the power supply connection portion 22, the load connection portion 23, and the fusible portion 24 are exposed to the outside of the resin member 26 (FIGS. 7, 10, and 11). In the circuit branching component (circuit protection component) 20, the resin member 26 is integrally formed with the circuit branching member (circuit protection member) 21 by using a synthetic resin material in a state where the power supply connection portion 22, the load connection portion 23, and the fusible portion 24 are exposed. Then, in the circuit branching component (circuit protection component) 20, a transparent resin cover 27 that is made of a synthetic resin material and covers the exposed fusible portion 24 is assembled to the resin member 26 (FIGS. 7 and 10).

The electrical connection box 1 includes a power-supply-side electrical connection structure 70 that physically and electrically connects the power-supply-side terminal fitting TB of the terminal of the power-supply-side electric wire WB, the second electrical connection portion 62 of the internal conductive member 60, and the power supply connection portion 22 of the circuit branching member (circuit protection member) 21 to each other (FIGS. 2, 5, 6, and 8). The power-supply-side electrical connection structure 70 is disposed outside the frame 40 and outside the tubular portion 41. Therefore, the power-supply-side electrical connection structure 70 physically and electrically connects the power-supply-side terminal fitting TB of the terminal of the power-supply-side electric wire WB, the second electrical connection portion 62 of the internal conductive member 60, and the power supply connection portion 22 of the circuit branching member (circuit protection member) 21 outside the frame 40.

The power-supply-side electrical connection structure 70 illustrated here includes a male screw member 71, a screw holding member 72 that holds the male screw member 71 in a state where a male screw portion is exposed, and a female screw member 73 to be screwed to the male screw portion of the male screw member 71 (FIGS. 5, 6, and 8). In the power-supply-side electrical connection structure 70, the male screw portion of the male screw member 71 is inserted into through-holes TBa, 62*a*, and 22*a* provided in the power-supply-side terminal fitting TB, the second electrical connection portion 62 of the internal conductive member 60, and the power supply connection portion 22 of the circuit branching member (circuit protection member) 21, respectively, and the female screw member 73 is screwed to the male screw portion, whereby the power-supply-side terminal fitting TB, the second electrical connection portion 62 of the internal conductive member 60, and the power supply connection portion 22 of the circuit branching member (circuit protection member) 21 are fastened and fixed together (FIGS. 5, 6, and 8).

Here, in the power-supply-side electrical connection structure 70, the male screw member 71 is disposed such that a screw axis of the male screw portion is aligned with a vertical direction (that is, a top-bottom direction of the vehicle) and the male screw portion protrudes from the screw holding member 72 vertically upward (that is, toward the upper side of the vehicle).

Figure 4:
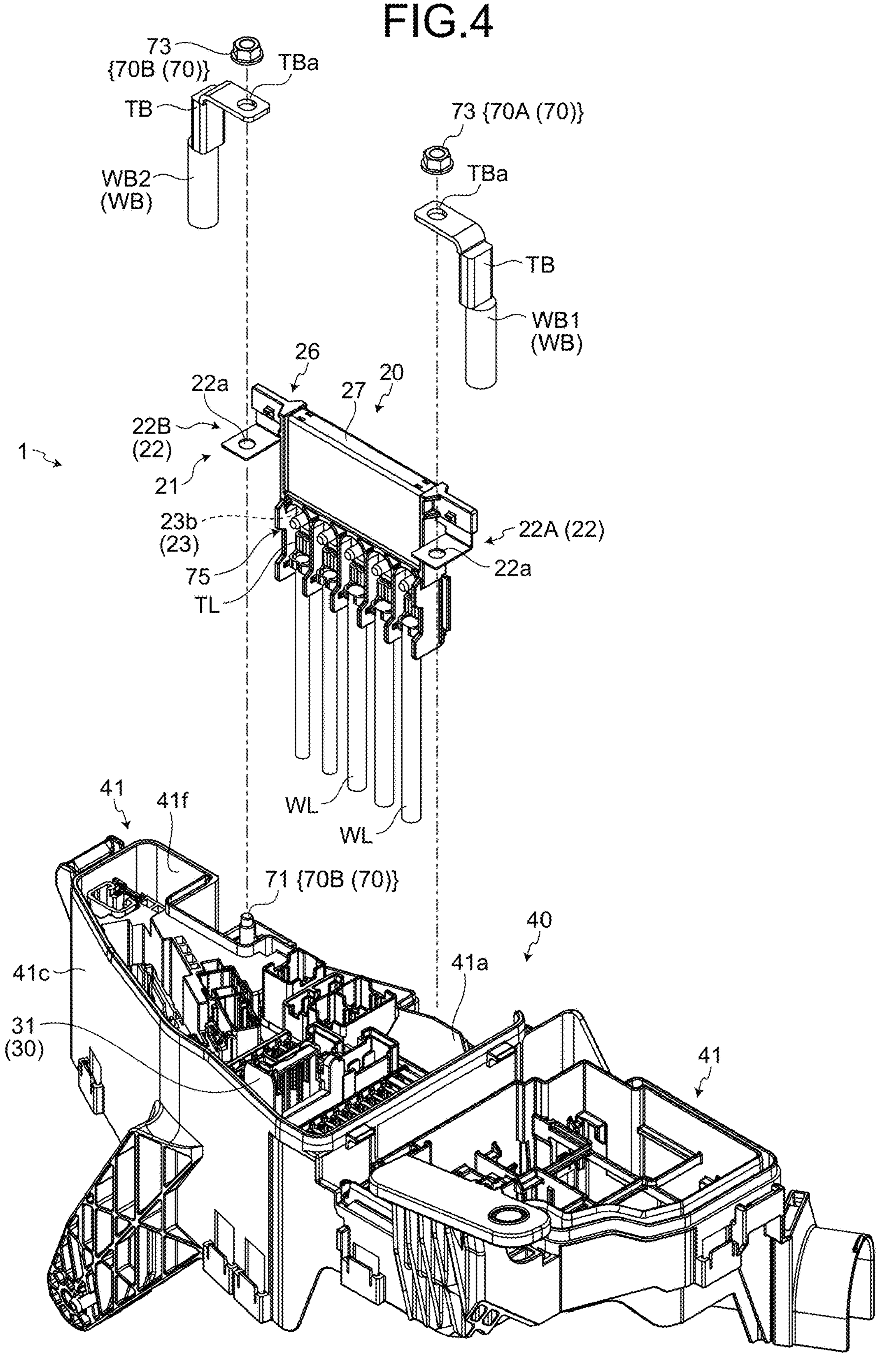
FIG. 4 is an exploded perspective view illustrating the electrical connection box (without the first cover member and a second cover member) according to the embodiment.

In addition, the electrical connection box 1 includes a load-side electrical connection structure 75 that physically and electrically connects the load-side terminal fitting TL of the terminal of the load-side electric wire WL and the load connection portion 23 of the circuit branching member (circuit protection member) 21 to each other (FIGS. 4, 7, and 10). The load-side electrical connection structure 75 is disposed outside the frame 40 and outside the tubular portion 41. Therefore, the load-side electrical connection structure 75 physically and electrically connects the load-side terminal fitting TL of the terminal of the load-side electric wire WL and the load connection portion 23 of the circuit branching member (circuit protection member) 21 outside the frame 40.

The load-side electrical connection structure 75 illustrated here includes a male screw member 76 and a female screw member 77 to be screwed to a male screw portion of the male screw member 76 (FIGS. 7 and 10). The resin member 26 is integrally formed with the male screw member 76 in a state where the male screw portion of the male screw member 76 is inserted into a through-hole 23*a* (FIG. 11) of the load connection portion 23 of the circuit branching member (circuit protection member) 21 and the male screw portion is exposed. The resin member 26 includes a holding portion 26*a* that holds the load connection portion 23 in a state where an exposed surface 23*b* of the load connection portion 23 is exposed (FIGS. 3 to 5, 7, and 10). In the load-side electrical connection structure 75, the male screw portion of the male screw member 76 is inserted into a through-hole TLa provided in the load-side terminal fitting TL, and the female screw member 77 is screwed to the male screw portion, whereby the load-side terminal fitting TL and the load connection portion 23 of the circuit branching member (circuit protection member) 21 are fastened and fixed together (FIGS. 7 and 10). Therefore, in the load-side electrical connection structure 75, the load-side terminal fitting TL is brought into close contact with the exposed surface 23*b* of the load connection portion 23 to be physically and electrically connected.

Specifically, the circuit branching component (circuit protection component) 20 is disposed outside the frame 40 as follows.

The frame 40 has a recess 42 which is a portion of the outer wall forming the outer frame that is recessed toward the inside of the tubular portion 41 and in which the circuit branching component (circuit protection component) 20 is disposed (FIGS. 2, 3, 5, and 12). The recess 42 desirably has a volume equal to or larger than a size of the circuit branching component (circuit protection component) 20 and can house the circuit branching component (circuit protection component) 20 such that the circuit branching component (circuit protection component) 20 does not protrude. For example, the tubular wall 41*c* of the tubular portion 41 has a facing wall body 41*f* disposed to face the circuit branching component (circuit protection component) 20 outside the tubular portion 41. The recess 42 is formed by making the facing wall body 41*f* be recessed toward the inside of the tubular portion 41.

In addition, the frame 40 includes a sub tubular portion 43 having an opening 43*a* opened in the same direction as the one opening 41*a* of the tubular portion 41 and bulging from the tubular wall 41*c* of the tubular portion 41 toward the outside of the frame 40 outside the tubular portion 41 (FIGS. 1 to 3, 5, 9, and 12). The sub tubular portion 43 is provided in the recess 42 of the frame 40. The sub tubular portion 43 illustrated here is formed as a tubular body having openings (openings 43*a* and 43*b*) at both ends. Therefore, in the sub tubular portion 43, one opening 43*a* is disposed on a side of the one opening 41*a* of the tubular portion 41, and the other opening 43*b* is disposed on a side of the other opening 41*b* of the tubular portion 41.

The power-supply-side electrical connection structure 70 is provided in the sub tubular portion 43. In the sub tubular portion 43, the screw holding member 72 of the power-supply-side electrical connection structure 70 is housed in the sub tubular portion 43, and the male screw portion of the male screw member 71 in the power-supply-side electrical connection structure 70 protrudes from the one opening 43*a*. Therefore, in the second electrical connection portion 62 of the internal conductive member 60, the male screw portion of the male screw member 71 protruding from the one opening 43*a* of the sub tubular portion 43 is inserted into a through-hole 62*a*. Therefore, the tubular wall 41*c* of the tubular portion 41 has a notch 44 through which the inside of the tubular portion 41 communicates with the inside of the sub tubular portion 43, and the second electrical connection portion 62 of the internal conductive member 60 protrudes toward the outside of the frame 40 outside the tubular portion 41 (FIGS. 5 and 6). The notch 44 is a notch formed by cutting out the tubular wall 41*c* of the tubular portion 41 from an end portion on a side of the other opening 41*b* toward the one opening 41*a*.

The block 30 includes a protruding block portion 32 that protrudes from the notch 44 toward the outside of the tubular portion 41 and is housed in the sub tubular portion 43 (FIGS. 5, 6, and 8). The screw holding member 72 is assembled to the protruding block portion 32, whereby the power-supply-side electrical connection structure 70 is held.

In the electrical connection box 1, in a state where the internal conductive member 60 is held by the block body 31 and the power-supply-side electrical connection structure 70 is held by the protruding block portion 32, the male screw portion of the male screw member 71 of the power-supply-side electrical connection structure 70 is inserted into the through-hole 62*a* of the second electrical connection portion 62 of the internal conductive member 60. In the electrical connection box 1, the block body 31 holding the internal conductive member 60 is inserted into the tubular portion 41 through the other opening 41*b*, and the protruding block portion 32 holding the power-supply-side electrical connection structure 70 is inserted into the sub tubular portion 43 through the other opening 43*b* together with the second electrical connection portion 62 of the internal conductive member 60.

In the electrical connection box 1, the male screw portion of the male screw member 71 is inserted into the through-hole 22*a* to assemble the power supply connection portion 22 of the circuit branching member (circuit protection member) 21 to the power-supply-side electrical connection structure 70, and further, the male screw portion of the male screw member 71 is inserted into the through-hole TBa to assemble the power-supply-side terminal fitting TB to the power-supply-side electrical connection structure 70. In the electrical connection box 1, the female screw member 73 is screwed to the male screw portion of the male screw member 71 to fasten and fix the power-supply-side terminal fitting TB, the second electrical connection portion 62 of the internal conductive member 60, and the power supply connection portion 22 of the circuit branching member (circuit protection member) 21 together. In the electrical connection box 1, the power-supply-side terminal fitting TB and the circuit branching component (circuit protection component) 20 are assembled to the block 30 via the power-supply-side electrical connection structure 70.

The one opening 43*a* of the sub tubular portion 43 is covered with the first cover member 51 assembled to the frame 40 together with the power-supply-side terminal fitting TB, the second electrical connection portion 62 of the internal conductive member 60, the power supply connection portion 22 of the circuit branching member (circuit protection member) 21, and the power-supply-side electrical connection structure 70, and is housed in the first cover member 51. The first cover member 51 covers the recess 42 of the frame 40, and houses the circuit branching component (circuit protection component) 20 in the recess 42 in a space between the recess 42 and the first cover member 51.

The other opening 43*b* of the sub tubular portion 43 is closed by an closing portion 53 provided in the second cover member 52 assembled to the frame 40 so as not to be exposed to the outside of the frame 40 (FIGS. 1, 3, 9, and 13).

Here, in the circuit branching component (circuit protection component) 20, the exposed surface 23*b* of the load connection portion 23 is disposed to face the facing wall body 41*f*, and the exposed surface 23*b* is interposed between the holding portion 26*a* of the resin member 26 and the facing wall body 41*f* in a state where the power supply connection portion 22 is assembled to the power-supply-side electrical connection structure 70 (FIG. 7). In the circuit branching component (circuit protection component) 20, the exposed surfaces 23*b* of all the load connection portions 23 are disposed to face the facing wall body 41*f*. That is, in the circuit branching component (circuit protection component) 20, all the load-side electrical connection structures 75 are provided on a side more adjacent to the facing wall body 41*f* than the holding portion 26*a*. Therefore, the load-side electrical connection structure 75 physically and electrically connects the load-side terminal fitting TL of the terminal of the load-side electric wire WL and the load connection portion 23 of the circuit branching member (circuit protection member) 21 on a side more adjacent to the facing wall body 41*f* than the holding portion 26*a*. As a result, in the electrical connection box 1, the circuit branching component (circuit protection component) 20 is assembled in a state where the load-side electrical connection structure 75 is hidden between the holding portion 26*a* of the resin member 26 and the facing wall body 41*f*. Therefore, in the electrical connection box 1, when the first cover member 51 is removed, it is possible to prevent contact of other components with the load-side electrical connection structure 75, the load-side terminal fitting TL, and the load connection portion 23 of the circuit branching member (circuit protection member) 21. Therefore, the electrical connection box 1 can suppress contact of other components such as a metal component and a tool with the load-side electrical connection structure 75 and the like, for example, when assembling work of peripheral components or maintenance work of peripheral components is performed, so that energization between the other components and the load-side electrical connection structure 75 and the like can be avoided.

In the circuit branching component (circuit protection component) 20, the power supply connection portion 22 exposed from the resin member 26 is disposed on a side more adjacent to the facing wall body 41*f* than the resin member 26 in a state where the power supply connection portion 22 is assembled to the power-supply-side electrical connection structure 70 (FIG. 6). That is, in the circuit branching component (circuit protection component) 20, the power-supply-side electrical connection structure 70 is provided on a side more adjacent to the facing wall body 41*f* than the resin member 26. Therefore, the power-supply-side electrical connection structure 70 physically and electrically connects the power-supply-side terminal fitting TB of the terminal of the power-supply-side electric wire WB, the second electrical connection portion 62 of the internal conductive member 60, and the power supply connection portion 22 of the circuit branching member (circuit protection member) 21 on a side more adjacent to the facing wall body 41*f* than the resin member 26. As a result, in the electrical connection box 1, the circuit branching component (circuit protection component) 20 is assembled in a state where the power-supply-side electrical connection structure 70 is hidden between the resin member 26 and the facing wall body 41*f*. Therefore, in the electrical connection box 1, when the first cover member 51 is removed, it is possible to prevent contact of other components with the power-supply-side electrical connection structure 70, the power-supply-side terminal fitting TB of the terminal of the power-supply-side electric wire WB, the second electrical connection portion 62 of the internal conductive member 60, and the power supply connection portion 22 of the circuit branching member (circuit protection member) 21 from a lateral side. Therefore, the electrical connection box 1 can suppress contact of other components such as a metal component and a tool with the power-supply-side electrical connection structure 70 and the like from a lateral side, for example, when assembling work of peripheral components or maintenance work of peripheral components is performed, so that energization between the other components and the load-side electrical connection structure 75 and the like can be avoided.

In the electrical connection box 1, all core wires of the power-supply-side electric wire WB and the load-side electric wire WL may be formed of copper or a copper alloy. However, in order to reduce weights of the power-supply-side electric wire WB and the load-side electric wire WL, at least one core wire thereof is desirably formed of aluminum or an aluminum alloy. For example, the power-supply-side electric wire WB and the load-side electric wire WL may be formed such that all the core wires are formed of aluminum or an aluminum alloy, or at least one core wire may be formed of aluminum or an aluminum alloy, and the remaining core wires may be formed of copper or a copper alloy.

In a case where the core wires of the power-supply-side electric wire WB and the load-side electric wire WL are formed of aluminum or an aluminum alloy, the weights of the power-supply-side electric wire WB and the load-side electric wire WL can be reduced as compared with a case where the core wires are formed of copper or a copper alloy. However, in this case, the power-supply-side electric wire WB and the load-side electric wire WL become thick and hard for a large current, and are difficult to bend. However, in the electrical connection box 1, the circuit branching component (circuit protection component) 20 is disposed outside the frame 40 and outside the tubular portion 41, and such a power-supply-side electric wire WB and a load-side electric wire WL that are difficult to bend are routed outside the frame 40. Therefore, the electrical connection box 1 can suppress an overload applied to the periphery in the housing due to the power-supply-side electric wire WB or the like, and can improve a housing property for other electric wires in the tubular portion 41.

Specifically, the electrical connection box 1 illustrated here includes, as the internal conductive members 60, a first internal conductive member 60A and a second internal conductive member 60B, and the first internal conductive member 60A and the second internal conductive member 60B are held by the block 30 (FIGS. 5 and 8). Here, two types of first internal conductive members 60A are provided as the internal conductive members 60.

The circuit branching member (circuit protection member) 21 illustrated here includes a first power supply connection portion 22A and a second power supply connection portion 22B as the power supply connection portions 22, and the first power supply connection portion 22A and the second power supply connection portion 22B are electrically connected to a first power-supply-side electric wire WB1 and a second power-supply-side electric wire WB2 as the power-supply-side electric wires WB, respectively (FIGS. 5, 10, and 11). In the circuit branching member (circuit protection member) 21, the first power supply connection portion 22A and the second power supply connection portion 22B are coupled by the coupling portion 25, and the fusible portion 24 is coupled to the first power supply connection portion 22A and the second power supply connection portion 22B via the coupling portion 25. That is, the fusible portion 24 is interposed between the first power supply connection portion 22A and the load connection portion 23, and is interposed between the second power supply connection portion 22B and the load connection portion 23.

The first power-supply-side electric wire WB1 is interposed between the first power supply connection portion 22A and the external power supply B when viewed from the circuit branching member (circuit protection member) 21, and electrically connects the first power supply connection portion 22A to the external power supply B. The second power-supply-side electric wire WB2 is electrically connected to an external electric component P such as an alternator or a DC-DC converter disposed outside the housing, and is electrically connected to the external power supply B via the circuit branching member (circuit protection member) 21 and the first power-supply-side electric wire WB1. That is, the second power-supply-side electric wire WB2 electrically connects the external electric component P to the external power supply B via the circuit branching member (circuit protection member) 21 and the first power-supply-side electric wire WB1.

The first power supply connection portion 22A is physically and electrically connected to the power-supply-side terminal fitting TB of the terminal of the first power-supply-side electric wire WB1 and the second electrical connection portion 62 of the first internal conductive member 60A. The electrical connection box 1 includes, as the power-supply-side electrical connection structures 70, a first power-supply-side electrical connection structure 70A that physically and electrically connects the power-supply-side terminal fitting TB of the terminal of the first power-supply-side electric wire WB1, the second electrical connection portion 62 of the first internal conductive member 60A, and the first power supply connection portion 22A of the circuit branching member (circuit protection member) 21 to each other (FIGS. 2, 5, 6, and 8). In the first power-supply-side electrical connection structure 70A, the male screw portion of the male screw member 71 is inserted into each of the through-holes TBa, 62*a*, and 22*a* of the power-supply-side terminal fitting TB of the terminal of the first power-supply-side electric wire WB1, the second electrical connection portion 62 of the first internal conductive member 60A, and the first power supply connection portion 22A of the circuit branching member (circuit protection member) 21, and the female screw member 73 is screwed to the male screw portion, whereby the power-supply-side terminal fitting TB, the second electrical connection portion 62 of the first internal conductive member 60A, and the first power supply connection portion 22A of the circuit branching member (circuit protection member) 21 are fastened and fixed together. Here, the power-supply-side terminal fitting TB, the second electrical connection portion 62 of each of the two first internal conductive members 60A, and the first power supply connection portion 22A of the circuit branching member (circuit protection member) 21 are fastened and fixed together.

The frame 40 illustrated here includes, as the sub tubular portion 43, a first sub tubular portion 43A having an opening (one opening 43*a*) opened in the same direction as the one opening 41*a* of the tubular portion 41 (FIGS. 1 to 3, 5, 6, 9, and 12). The first sub tubular portion 43A houses the first power-supply-side electrical connection structure 70A therein, and the male screw portion of the male screw member 71 in the first power-supply-side electrical connection structure 70A protrudes from the one opening 43*a* of the first sub tubular portion 43A. The first sub tubular portion 43A is provided in the recess 42 of the frame 40. The tubular wall 41*c* of the tubular portion 41 has, as the notch 44, a first notch 44A through which the inside of the tubular portion 41 communicates with the inside of the first sub tubular portion 43A, and the second electrical connection portion 62 of the first internal conductive member 60A protrudes toward the outside the frame 40 outside the tubular portion 41 (FIGS. 5 and 6). The block 30 includes, as the protruding block portion 32 to which the screw holding member 72 of the first power-supply-side electrical connection structure 70A is assembled, a first protruding block portion 32A that protrudes from the first notch 44A toward the outside of the tubular portion 41 and is housed in the first sub tubular portion 43A (FIGS. 5, 6, and 8).

In the electrical connection box 1, the first protruding block portion 32A, the first power-supply-side electrical connection structure 70A, and the respective second electrical connection portions 62 of the two first internal conductive members 60A are housed in the first sub tubular portion 43A in a state where the male screw portion of the male screw member 71 is pulled out from the one opening 43*a* of the first sub tubular portion 43A (FIG. 6).

The second power supply connection portion 22B is physically and electrically connected to the power-supply-side terminal fitting TB of the terminal of the second power-supply-side electric wire WB2 and the second electrical connection portion 62 of the second internal conductive member 60B. The electrical connection box 1 includes, as the power-supply-side electrical connection structure 70, a second power-supply-side electrical connection structure 70B that physically and electrically connects the power-supply-side terminal fitting TB of the terminal of the second power-supply-side electric wire WB2, the second electrical connection portion 62 of the second internal conductive member 60B, and the second power supply connection portion 22B of the circuit branching member (circuit protection member) 21 to each other (FIGS. 2, 5, and 8). In the second power-supply-side electrical connection structure 70B, the male screw portion of the male screw member 71 is inserted into each of the through-holes TBa, 62*a*, and 22*a* of the power-supply-side terminal fitting TB of the terminal of the second power-supply-side electric wire WB2, the second electrical connection portion 62 of the second internal conductive member 60B, and the second power supply connection portion 22B of the circuit branching member (circuit protection member) 21, and the female screw member 73 is screwed to the male screw portion, whereby the power-supply-side terminal fitting TB, the second electrical connection portion 62 of the second internal conductive member 60B, and the second power supply connection portion 22B of the circuit branching member (circuit protection member) 21 are fastened and fixed together.

The frame 40 illustrated here includes, as the sub tubular portion 43, a second sub tubular portion 43B having an opening (one opening 43*a*) opened in the same direction as the one opening 41*a* of the tubular portion 41 (FIGS. 1 to 3, 5, 9, and 12). The second sub tubular portion 43B houses the second power-supply-side electrical connection structure 70B therein, and the male screw portion of the male screw member 71 in the second power-supply-side electrical connection structure 70B protrudes from the one opening 43*a* of the second sub tubular portion 43B. The second sub tubular portion 43B is provided in the recess 42 of the frame 40. The tubular wall 41*c* of the tubular portion 41 has, as the notch 44, a second notch 44B through which the inside of the tubular portion 41 communicates with the inside of the second sub tubular portion 43B, and the second electrical connection portion 62 of the second internal conductive member 60B protrudes toward the outside of the frame 40 outside the tubular portion 41 (FIG. 5). The block 30 includes, as the protruding block portion 32 to which the screw holding member 72 of the second power-supply-side electrical connection structure 70B is assembled, a second protruding block portion 32B that protrudes from the second notch 44B toward the outside of the tubular portion 41 and is housed in the second sub tubular portion 43B (FIGS. 5 and 8).

In the electrical connection box 1, the second protruding block portion 32B, the second power-supply-side electrical connection structure 70B, and the second electrical connection portion 62 of the second internal conductive member 60B are housed in the second sub tubular portion 43B in a state where the male screw portion of the male screw member 71 is pulled out from the one opening 43*a* of the second sub tubular portion 43B.

In the electrical connection box 1, the male screw portion of the male screw member 71 of the first power-supply-side electrical connection structure 70A is inserted into the through-hole 22*a* of the first power supply connection portion 22A to assemble the first power supply connection portion 22A to the first power-supply-side electrical connection structure 70A, and the male screw portion of the male screw member 71 of the second power-supply-side electrical connection structure 70B is inserted into the through-hole 22*a* of the second power supply connection portion 22B to assemble the second power supply connection portion 22B to the second power-supply-side electrical connection structure 70B. In the electrical connection box 1, the male screw portion of the male screw member 71 of the first power-supply-side electrical connection structure 70A is inserted into the through-hole TBa of the power-supply-side terminal fitting TB of the first power-supply-side electric wire WB1 to assemble the power-supply-side terminal fitting TB to the first power-supply-side electrical connection structure 70A, and the male screw portion of the male screw member 71 of the second power-supply-side electrical connection structure 70B is inserted into the through-hole TBa of the power-supply-side terminal fitting TB of the second power-supply-side electric wire WB2 to assemble the power-supply-side terminal fitting TB to the second power-supply-side electrical connection structure 70B. In the electrical connection box 1, the female screw member 73 is screwed to the male screw portion of each male screw member 71 to fasten and fix the power-supply-side terminal fitting TB of the first power-supply-side electric wire WB1, the respective second electrical connection portions 62 of the two first internal conductive members 60A, and the first power supply connection portion 22A of the circuit branching member (circuit protection member) 21 together, and fasten and fix the power-supply-side terminal fitting TB of the second power-supply-side electric wire WB2, the second electrical connection portion 62 of the second internal conductive member 60B, and the second power supply connection portion 22B of the circuit branching member (circuit protection member) 21 together. In the electrical connection box 1, the two power-supply-side terminal fittings TB and the circuit branching component (circuit protection component) 20 are assembled to the block 30 via the first power-supply-side electrical connection structure 70A and the second power-supply-side electrical connection structure 70B.

The one opening 43*a* of each of the first sub tubular portion 43A and the second sub tubular portion 43B is covered by the first cover member 51 together with the two power-supply-side terminal fittings TB, the second electrical connection portion 62 of each of the two first internal conductive members 60A and the second internal conductive member 60B, the first power supply connection portion 22A and the second power supply connection portion 22B of the circuit branching member (circuit protection member) 21, the first power-supply-side electrical connection structure 70A and the second power-supply-side electrical connection structure 70B, and is housed in the first cover member 51.

The second cover member 52 includes, as the closing portions 53, a first closing portion 53A that closes the other opening 43*b* of the first sub tubular portion 43A so as not to be exposed to the outside of the frame 40, and a second closing portion 53B that closes the other opening 43*b* of the second sub tubular portion 43B so as not to be exposed to the outside of the frame 40 (FIGS. 1, 3, 9, and 13). The first closing portion 53A and the second closing portion 53B may be one plate-shaped wall portion that closes the other opening 43*b* from the outside of the frame 40 together with the first notch 44A and the second notch 44B, or may be formed of a plurality of wall portions that surrounds and covers the other opening 43*b* from the outside of the frame 40 together with the first notch 44A and the second notch 44B. Here, the first divided cover 52A is assembled to a peripheral edge of the other opening 41*b* of the tubular portion 41 on which the first sub tubular portion 43A and the second sub tubular portion 43B are provided. Therefore, the first closing portion 53A and the second closing portion 53B are provided in the first divided cover 52A.

Here, in the circuit branching component (circuit protection component) 20, the exposed surfaces 23*b* of all the load connection portions 23 are disposed to face the facing wall body 41*f*, and the exposed surface 23*b* is interposed between the holding portion 26*a* of the resin member 26 and the facing wall body 41*f* in a state where the first power supply connection portion 22A is assembled to the first power-supply-side electrical connection structure 70A and the second power supply connection portion 22B is assembled to the second power-supply-side electrical connection structure 70B (FIG. 7). Therefore, all the load-side electrical connection structures 75 physically and electrically connect the load-side terminal fitting TL of the terminal of the load-side electric wire WL and the load connection portion 23 of the circuit branching member (circuit protection member) 21 on a side more adjacent to the facing wall body 41*f* than the holding portion 26*a*. Therefore, in the electrical connection box 1, when the first cover member 51 is removed, it is possible to prevent contact of other components with the load-side electrical connection structure 75, the load-side terminal fitting TL, and the load connection portion 23 of the circuit branching member (circuit protection member) 21.

In the circuit branching component (circuit protection component) 20, the first power supply connection portion 22A and the second power supply connection portion 22B exposed from the resin member 26 are disposed on a side more adjacent to the facing wall body 41*f* than the resin member 26 in a state where the first power supply connection portion 22A is assembled to the first power-supply-side electrical connection structure 70A and the second power supply connection portion 22B is assembled to the second power-supply-side electrical connection structure 70B (FIG. 6). Therefore, the first power-supply-side electrical connection structure 70A physically and electrically connects the power-supply-side terminal fitting TB of the terminal of the first power-supply-side electric wire WB1, the second electrical connection portion 62 of each of the two first internal conductive members 60A, and the first power supply connection portion 22A of the circuit branching member (circuit protection member) 21 on a side more adjacent to the facing wall body 41*f* than the resin member 26. Further, the second power-supply-side electrical connection structure 70B physically and electrically connects the power-supply-side terminal fitting TB of the terminal of the second power-supply-side electric wire WB2, the second electrical connection portion 62 of the second internal conductive member 60B, and the second power supply connection portion 22B of the circuit branching member (circuit protection member) 21 on a side more adjacent to the facing wall body 41*f* than the resin member 26. Therefore, in the electrical connection box 1, when the first cover member 51 is removed, it is possible to prevent contact of other components with the first power-supply-side electrical connection structure 70A, the second power-supply-side electrical connection structure 70B, the power-supply-side terminal fitting TB of the terminal of the first power-supply-side electric wire WB1, the power-supply-side terminal fitting TB of the terminal of the second power-supply-side electric wire WB2, the second electrical connection portion 62 of each of the two first internal conductive members 60A, the second electrical connection portion 62 of the second internal conductive member 60B, and the first power supply connection portion 22A and the second power supply connection portion 22B of the circuit branching member (circuit protection member) 21 from a lateral side.

As described above, in the electrical connection box 1 according to the present embodiment, the circuit branching component (circuit protection component) 20 is disposed outside the frame 40 and outside the tubular portion 41, and thus, it is possible to suppress an overload applied to the periphery in the housing due to the power-supply-side electric wire WB (the first power-supply-side electric wire WB1 and the second power-supply-side electric wire WB2) and the load-side electric wire WL connected to the circuit branching component (circuit protection component) 20. In particular, in the electrical connection box 1, the power-supply-side electric wire WB (the first power-supply-side electric wire WB1 and the second power-supply-side electric wire WB2) and the load-side electric wire WL are difficult to bend as the diameter of the electric wire increases, and thus, it is possible to suppress an overload applied to the periphery in the housing due to the power-supply-side electric wire WB and the like. For example, in the electrical connection box 1, the deformation of the second cover member 52 can be suppressed by suppressing an overload applied to the second cover member 52 in the housing due to the power-supply-side electric wire WB or the like. In addition, the electrical connection box 1 can improve the housing property for other electric wires in the tubular portion 41 by routing the power-supply-side electric wire WB and the like that are difficult to bend outside the frame 40. In addition, in the electrical connection box 1, the power-supply-side electric wire WB and the like are routed outside the frame 40, and thus, heat generated by the power-supply-side electric wire WB and the like does not stagnate in the housing, so that a temperature rise in the housing can be suppressed. Further, in the electrical connection box 1, the physical and electrical connection point (the first power-supply-side electrical connection structure 70A, the second power-supply-side electrical connection structure 70B, or the like) in the circuit branching component (circuit protection component) 20 is disposed on a side more adjacent to the housing than the resin member 26 while these effects are exhibited, and thus, it is possible to suppress contact of other components with the connection point.

In the electrical connection box according to the present embodiment, the circuit branching component is disposed outside the tubular portion and outside the frame, so that it is possible to suppress an overload in the housing due to the electric wire connected to the circuit branching component. Further, in the electrical connection box, the physical and electrical connection point (the first power-supply-side electrical connection structure, the second power-supply-side electrical connection structure, or the like) in the circuit branching component is disposed on a side more adjacent to the housing than the resin member, and thus, it is possible to suppress contact of other components with the connection point.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:

an electronic component;

an internal conductive member that electrically connects the electronic component to an external power supply;

a frame that includes a tubular portion that includes a tubular wall having an opening at least at one end and houses and holds the electronic component and the internal conductive member in the tubular portion;

a cover member that closes the opening of the tubular portion; and a circuit branching component that is disposed outside the frame and outside the tubular portion and includes a conductive circuit branching member embedded in a resin member and interposed between the external power supply and an external load, wherein the internal conductive member includes a first electrical connection portion and a second electrical connection portion that are physically and electrically connected to the electronic component in the tubular portion, the circuit branching member includes a power supply connection portion that is exposed to an outside of the resin member, is disposed outside the frame and outside the tubular portion, and is physically and electrically connected to a power-supply-side terminal fitting of a terminal of a power-supply-side electric wire electrically connected to the external power supply and the second electrical connection portion of the internal conductive member, and a load connection portion that is exposed to the outside of the resin member, is disposed outside the frame and outside the tubular portion, and is physically and electrically connected to a load-side terminal fitting of a terminal of a load-side electric wire electrically connected to the external load, the tubular wall of the tubular portion includes a facing wall body disposed to face the circuit branching component outside the tubular portion, the resin member includes a holding portion that holds the load connection portion in a state where an exposed surface of the load connection portion is exposed, and the circuit branching component is disposed such that the exposed surface of the load connection portion faces the facing wall body, and the exposed surface is interposed between the holding portion and the facing wall body.

2. The electrical connection box according to claim 1, wherein a load-side electrical connection structure that physically and electrically connects the load-side terminal fitting of the terminal of the load-side electric wire and the load connection portion of the circuit branching member on a side more adjacent to the facing wall body than the holding portion is provided outside the frame and outside the tubular portion.

3. The electrical connection box according to claim 2, wherein the power supply connection portion exposed from the resin member is disposed on a side more adjacent to the facing wall body than the resin member.

4. The electrical connection box according to claim 3, wherein a power-supply-side electrical connection structure that physically and electrically connects the power-supply-side terminal fitting of the terminal of the power-supply-side electric wire, the second electrical connection portion of the internal conductive member, and the power supply connection portion of the circuit branching member on a side more adjacent to the facing wall body than the resin member is provided outside the frame and outside the tubular portion.

5. The electrical connection box according to claim 1, wherein the power supply connection portion exposed from the resin member is disposed on a side more adjacent to the facing wall body than the resin member.

6. The electrical connection box according to claim 5, wherein a power-supply-side electrical connection structure that physically and electrically connects the power-supply-side terminal fitting of the terminal of the power-supply-side electric wire, the second electrical connection portion of the internal conductive member, and the power supply connection portion of the circuit branching member on a side more adjacent to the facing wall body than the resin member is provided outside the frame and outside the tubular portion.

* * * * *